Oct. 13, 1931.          L. DOTY ET AL          1,827,465
                        DEMOUNTABLE RIM
             Filed Feb. 27, 1928       2 Sheets-Sheet 1
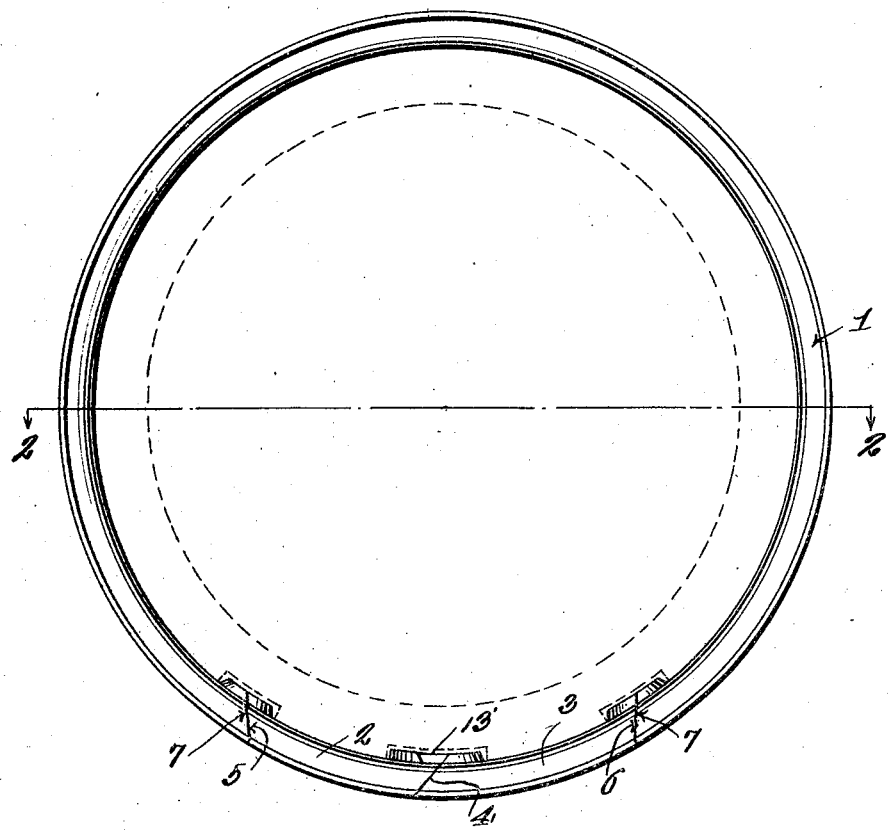
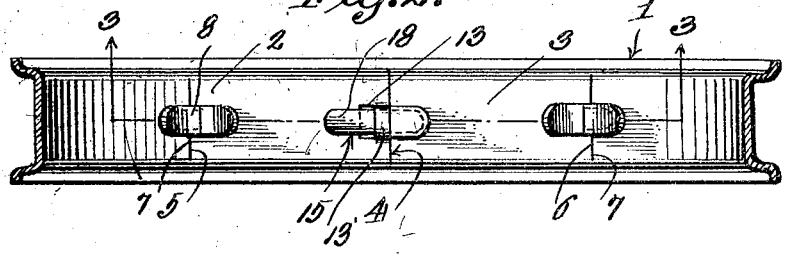
WITNESS                              Inventor
                                  LEE DOTY
                                  RALEIGH S. CARROLL
                          By                  Attorney

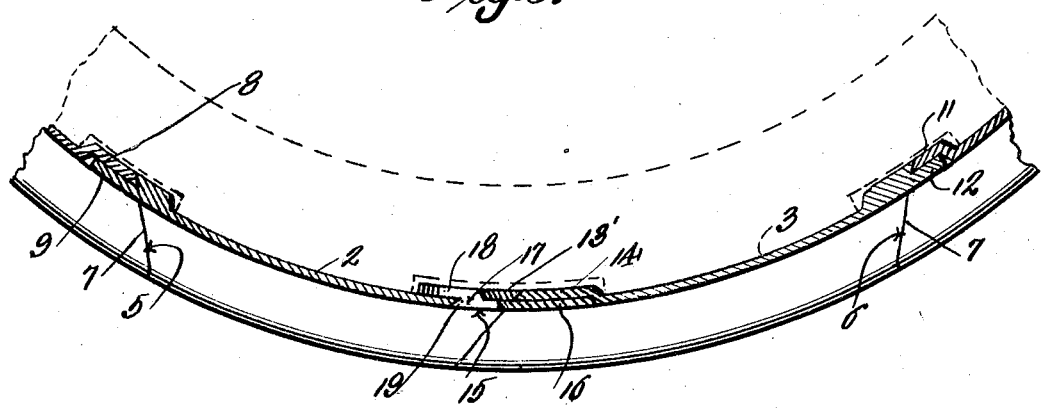

Patented Oct. 13, 1931

1,827,465

UNITED STATES PATENT OFFICE

LEE DOTY AND RALEIGH S. CARROLL, OF KLAMATH FALLS, OREGON; SAID DOTY ASSIGNOR, BY DIRECT AND MESNE ASSIGNMENTS, OF THREE-TENTHS TO SELWYN W. KESLER, OF JACKSON COUNTY, OREGON, AND ONE-FIFTH TO HAROLD W. HERRICK, OF WINFIELD, KANSAS

DEMOUNTABLE RIM

Application filed February 27, 1928. Serial No. 257,466.

This invention relates to the class of demountable vehicle rims and pertains particularly to a rim designed to be broken transversely to facilitate its removal from and application to a tire.

The primary object of the present invention is to provide a vehicle tire rim which can be easily and quickly distorted or broken to reduce the circumference thereof so that a vehicle tire can be placed thereon or removed therefrom with ease.

Another object of the invention is to provide a vehicle tire rim which, after being broken and having had a tire placed thereon, can be restored to normal size and shape easily and quickly.

The invention will be best understood from a consideration of the following detailed description taken in connection with the accompanying drawings forming a part of the present specification, with the understanding, however, that the invention is not confined to any strict conformity with the showing of the drawings, but may be changed or modified so long as such changes or modifications mark no material departure from the salient features of the invention as expressed in the appended claims.

In the drawings:

Figure 1 shows the tire rim embodying the present invention, in side elevation.

Figure 2 is a section taken upon the line 2—2 of Fig. 1.

Figure 3 is an enlarged sectional view taken upon the line 3—3 of Fig. 2.

Figure 4 is a detailed perspective view of one of the ends of the split rim showing the means provided for the reception of an engaging tongue carried by a removable section of the rim.

Figure 5 is a detailed perspective view of one end of one of the removable rim sections which co-acts with the end shown in Fig. 4.

Figure 6 is a detailed perspective view of one end of one of the movable rim sections against which an end of an adjacent and similar section abuts and with which it interlocks.

Figure 7 is a detailed perspective view of the inner end of the other removable section, showing seat for a locking tongue which is molded thereto.

Figure 8 is a detailed perspective view of the locking or coupling tongue which is welded in the seat formed in the member shown in Figure 7.

Referring now to the drawings in detail, wherein like numerals of reference indicate corresponding parts throughout the several views, the numeral 1 indicates the major section and the numerals 2 and 3 the inner sections of the rim which is of channel formation, the adjacent or abutting ends of the sections 2 and 3 being cut obliquely of the rim as indicated at 4. The remote ends 5 and 6 of the rim sections 2 and 3, respectively are each cut obliquely of the rim, also, as shown. The ends of the section 1 and the remote ends of the sections 2 and 3 are arranged at acute angles with respect to the bottom walls of the sections 2 and 3. The ends 7 of the section 1 which abut the angled ends 5 and 6 of the sections 2 and 3 are similarly formed to make a tight joint with the ends 5 and 6 of the sections 2 and 3 as clearly shown in Fig. 1 and it will be readily seen that when the sections 2 and 3 are in position with the hereinafter described locking means connecting the inner or abutting ends thereof, any pressure exerted from the inside of the rim against the sections will have a tendency to tighten the same in their respective positions.

The inner face of the section 1 adjacent each end thereof is formed to provide the receiving pocket or recess 8 for the reception of the engaging finger 9 carried by and extending from the central portion of the end of the section 2 in the manner as clearly shown in Fig. 3. An additional reinforcing lug 10 is formed upon the inner face of the section 2 at the inner end of the finger 9 and provided with a recess snugly receiving beveled edge of the pocket 8 in which the adjacent finger 9 extends.

The opposite end of the section 1 is also provided with a locking finger receiving pocket 11 designed to receive the finger member 12 carried upon the section 2. The section 3 is provided with a lug similar to the lug 10, and the pocket 11 has a beveled edge which fits snugly in a recess carried by this lug.

As shown in Figure 3, when the rim is in operative position, the sections 2 and 3 are in alinement with their inner ends in abutting relation. One of the sections, for example, the section 2, is provided adjacent its inner end with a transverse slot 13, the portion lying between the slot and the adjacent edge of the section being bridged inwardly of the rim as indicated at 13'. Under this section the tongue hereinafter described, carried by the adjacent section, engages.

The locking key or tongue which is employed to connect the sections 2 and 3, is shown in detail in Figure 8 and comprises an elongated member indicated as a whole by the numeral 15, which in turn is made up of a tongue portion 16 designed to be positioned in the pocket 14 of the section 3 and welded thereto, and a jaw 17 formed at one end of the tongue which jaw comprises a relatively long inner lip 18 and short outer lip 19. When the locking key or tongue is welded in position at the inner end of the section 3 and the sections 2 and 3 are to be placed in position to form a complete rim, the inner lip 18 of the jaw 17 is extended through the slot 13 from the outside thereof and the outer ends of the sections are positioned in the main section of the rim to engage in the pockets 8 and 11. When in position pressure is applied simultaneously to the two engaging ends of the sections 2 and 3 and the same forced outwardly apart causing the sections to assume the position shown in Figure 3, the key 17 engaging under the bridge 13' at the inner end of the tongue portion 16.

From the foregoing it will be readily seen that a tire can be easily placed upon the larger section of the rim after which the two sections 2 and 3 can be arranged in position in the manner described, and pressed into place.

It will of course be readily understood that when it is desired to remove the tire from the rim a reversal of the foregoing operation is employed to produce the desired results.

Having thus described our invention, what we claim is:—

In a demountable rim of the character set forth, a pair of sections having abutting end portions, one section having a transversely extending slot and the portion thereof adjacent the slot off-set inwardly to form a raised bridge, the other section having a struck up pocket an elongated tongue secured in said pocket and extending beyond the end portion of the last mentioned section in the same plane as the surface of the section, the outer end portion of the tongue being off-set inwardly at a distance from the section supporting it, a lip extending from the tongue at the junction of the off-set and parallel to but spaced from the off-set end, whereby said tongue will fit under the bridge and extend through said slot to fit upon the section adjacent the slot, while the lip engages the opposite surface of the same section, as and for the purposes set forth.

In testimony whereof we affix our signatures.

LEE DOTY.
RALEIGH S. CARROLL.